UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYES AND PROCESS OF MAKING SAME.

1,047,812.   Specification of Letters Patent.   Patented Dec. 17, 1912.

No Drawing.   Application filed September 6, 1911. Serial No. 647,932.

*To all whom it may concern:*

Be it known that I, MAX HENRY ISLER, citizen of the Swiss Republic, residing at Mannheim, Germany, have invented new and useful Improvements in Anthracene Dyes and Processes of Making Same, of which the following is a specification.

My invention consists in the production of a new class of anthraquinone derivatives which I regard as hydrazones of the anthraquinone series. These new compounds can be obtained by treating an anthraquinone aldehyde, or a derivative thereof, with a hydrazin of the anthraquinone series. Instead of employing the anthraquinone aldehydes themselves, the corresponding omega-dihalogen-methyl-anthraquinone compounds can be employed, as they give rise to the same products and can therefore be regarded as equivalent to the aldehydes. I prefer to carry out the reaction by treating the anthraquinone aldehyde, or derivative thereof, with the hydrazin with, or without, the use of a solvent or a diluent, and the reaction generally takes places very rapidly, giving rise to compounds which are either themselves coloring matters or which can be used in the manufacture of coloring matters.

The hydrazins of the anthraquinone series which are employed according to my invention can be obtained, for instance, as described in German Patent No. 163,447.

The following examples will serve to illustrate how this invention can be carried into practical effect, but my invention is not limited to these examples. The parts are by weight.

Example 1: Boil together for fifteen minutes, fourteen parts of 1-chlor-anthraquinone-2-aldehyde, twelve parts of anthraquinone-2-hydrazin, and three hundred parts of naphthalene. After the reaction is complete, remove the naphthalene, for instance by means of toluene, whereupon the desired product is obtained as a red powder which yields a bluish red solution in concentrated sulfuric acid. It dyes cotton, from a vat, deep Bordeaux red shades.

The product is probably a hydrazone possessing a constitution corresponding to the formula

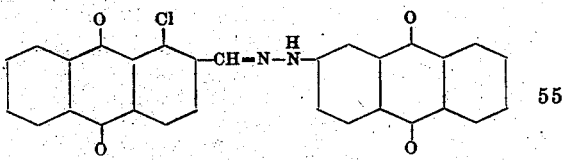

If, in this example, the 1-chlor-anthraquinone-2-aldehyde be replaced by anthraquinone-2-aldehyde, a coloring matter is obtained which produces shades which are somewhat bluer.

Example 2: Boil together fifteen parts of omega-dichlor-2-methyl-anthraquinone, thirteen parts of anthraquinone-2-hydrazin, ten parts of anhydrous sodium acetate, and two hundred parts of nitrobenzene. When, from a test portion, it is seen that the formation of the coloring matter is complete, allow the mass to cool to about fifty degrees centigrade and filter, and wash with alcohol. The coloring matter is like that obtained from anthraquinone-2-aldehyde and anthraquinone-2-hydrazin, as described in the foregoing example.

Example 3: Treat sixteen parts of 1-hydroxy-4-brom-anthraquinone-2-aldehyde, twelve parts of anthraquinone-2-hydrazin, and three hundred parts of naphthalene in a manner similar to that described in the foregoing Example 1. From the vat the product obtained dyes cotton violet.

Example 4: Condense fifty-five parts of 1-chlor-anthraquinone-2-aldehyde and twenty-seven parts of anthraquinone-1.5-dihydrazin, in the manner described in the foregoing Example 1. The product yields a yellow-red solution in concentrated sulfuric acid and it is almost insoluble in boiling nitrobenzene. It dyes cotton, from the hydrosulfite vat, Bordeaux red. If, in this example, the anthraquinone-1.5-dihydrazin be replaced by anthraquinone-2.6-dihydrazin, a somewhat yellower coloring matter is obtained.

Example 5: Treat thirteen parts of nitro-anthraquinone-2-aldehyde (obtainable by nitrating anthraquinone-2-aldehyde), twenty-four parts of anthraquinone-2-hydrazin, and three hundred parts of naphthalene in the manner described in the foregoing Example 1. The product yields a beautiful carmine red solution in concentrated sulfuric acid and dyes cotton pure Bordeaux red. The analogous coloring matter can be obtained from the amino compound produced by reducing the aforesaid nitro-anthraquinone-2-aldehyde. In this example, instead of anthraquinone-2-hydrazin, anthraquinone-1.5-dihydrazin, or anthraquinone-2.6-dihydrazin, or a derivative thereof or of other anthraquinone-mono- or di-hydrazins can be employed.

The following table gives some of the properties of a few of the coloring matters obtainable according to my invention:—

| Condensation product— | | Dyes cotton from the vat. | Solution in— | |
| --- | --- | --- | --- | --- |
| From— | And— | | Concentrated sulfuric acid. | +Boric acid. |
| Anthraquinone-2-aldehyde | Anthraquinone-2-hydrazin | Dull red | Cherry red | Unchanged. |
| 1-chlor-anthraquinone-2-aldehyde | ....do | ....do | Bluish red | Do. |
| 1-hydroxy-4-brom-anthraquinone-2-aldehyde. | ....do | Dull violet | ....do | Do. |
| 1-hydroxy-anthraquinone-2-aldehyde | ....do | ....do | ....do | Do. |
| 6-chlor-anthraquinone-2-aldehyde | ....do | Dull red | Cherry red | Do. |
| 1.6-dichlor-anthraquinone-2-aldehyde | ....do | Yellowish red | ....do | Do. |
| 4-chlor-anthraquinone-1-aldehyde | Anthraquinone-2-hydrazin | Brick red | Bluish red | Do. |
| Do | Anthraquinone-1-hydrazin | Yellow-red | Brown-yellow | Cherry red. |
| Anthraquinone-2-aldehyde | ....do | Dull red | Yellow-red | Cherry red. |
| Nitro-anthraquinone-2-aldehyde | Anthraquinone-2-hydrazin | Pure Bordeaux | Carmine red | Unchanged. |
| Amino-anthraquinone-2-aldehyde | ....do | Dull red | Cherry red | Do. |
| 1-chlor-anthraquinone-2-aldehyde | Anthraquinone-1.5-dihydrazin | Dull Bordeaux | Yellow-red | Green-blue. |

The 4-chlor-anthraquinone-1-aldehyde mentioned above can be obtained by condensing phthalic anhydrid with para-chlortoluene and then chlorinating the 1-methyl-4-chlor-anthraquinone thus obtained, so that two atoms of chlorin enter the methyl group, and then subjecting the product obtained to saponification.

Now what I claim is:—

1. The process of producing coloring matter of the anthracene series by treating an anthraquinone aldehyde with a hydrazin of the anthracene series.

2. The process of producing coloring matter of the anthracene series by treating 1-chlor-anthraquinone-2-aldehyde with anthraquinone-2-hydrazin.

3. As new articles of manufacture the coloring matters which can be obtained by treating an anthraquinone aldehyde with a hydrazin of the anthracene series, which new coloring matters are probably hydrazones of the anthraquinone series and consist when dry of reddish powders and yield from brown-yellow to carmine-red solutions in concentrated sulfuric acid, and dye cotton from an alkaline hydrosulfite vat yellowish red to violet shades.

4. As a new article of manufacture the coloring matter which can be obtained by treating 1-chlor-anthraquinone-2-aldehyde with anthraquinone-2-hydrazin, which new coloring matter is probably a hydrazone possessing a constitution corresponding to the formula

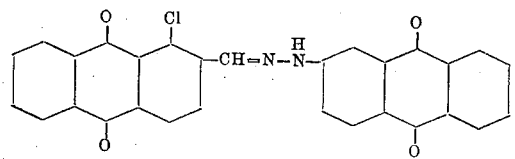

and consists when dry of a red powder, yields a bluish red solution in concentrated sulfuric acid, which solution is unchanged in color on the addition of boric acid and which dyes cotton from an alkaline hydrosulfite vat dull violet shades.

In testimony whereof I have hereunto set my hand in the presence of two subscribing witnesses.

MAX HENRY ISLER.

Witnesses:
J. ALEC. LLOYD,
JOSEPH HEIFFER.